US007352723B2

(12) United States Patent
Barry et al.

(10) Patent No.: US 7,352,723 B2
(45) Date of Patent: Apr. 1, 2008

(54) METHOD OF FORMING A CODED COMPOSITE TRANSPORT CHANNEL FOR DOWNLINK TRANSMISSIONS

(75) Inventors: Mark Barry, Sydney (AU); Hettiachchi Upul Gunawardana, Sydney (AU); Yi-Chen Li, Sydney (AU); Koen van den Beld, Sydney (AU)

(73) Assignee: Lucent Technologies Inc., Murray Hill, NJ (US)

( * ) Notice: Subject to any disclaimer, the term of this patent is extended or adjusted under 35 U.S.C. 154(b) by 1075 days.

(21) Appl. No.: 10/422,838

(22) Filed: Apr. 25, 2003

(65) Prior Publication Data
US 2004/0213183 A1    Oct. 28, 2004

(51) Int. Cl.
*H04B 7/216* (2006.01)
(52) U.S. Cl. ............... 370/335; 370/342; 370/535
(58) Field of Classification Search ............... None
See application file for complete search history.

(56) References Cited

U.S. PATENT DOCUMENTS 6,392,572 B1 * 5/2002 Shiu et al. ............... 341/81
6,735,723 B2 * 5/2004 Park et al. ............... 714/701
7,187,708 B1 * 3/2007 Shiu et al. ............... 375/148

OTHER PUBLICATIONS

ARIB STD-T63-25.212 V3.1.1, Multiplexing and Channel Coding (FDD), pp. 1-52, 1999.*
"Insertion of DTX indication bits in downlink", Jun. 1999, 1-4 pgs., TSG-RAN WG1 meeting #6, Espoo, Finland.
Hidehiro Ando, et al., "*2-step Multiplexing Channel Interleaver for W-CDMA Mobile Radio*", pp. 2123-2127, NTT Mobile Communications Network, Inc., JAPAN.
Albert Tarable, et al., "*Analysis and Design of Interleavers for CDMA Systems*", Jun. 24-29, 2001, p. 214, ISIT2001, Washington, D.C.

* cited by examiner

*Primary Examiner*—Frank Duong

(57) ABSTRACT

In a communication method, data from a plurality of channels is combined into a composite channel by writing data from the plurality of channels as one-bit symbols to a memory, and reading out the data from memory to form the composite channel. The combining of radio frames from the channels forms a coded composite transport channel for transmitting the data in the downlink. To form the coded composite transport channel, an input process is initiated to write data for each radio frame of a transport channel as one bit symbols to a memory of an interleaver. On an output side of the interleaver, an output process to read out the data stored in the memory is performed to form the coded composite transport channel.

22 Claims, 7 Drawing Sheets

PRIOR ART

PRIOR ART

| p | gi1 | p | gi2 | gi3 | p | gi4 | gi5 |
|---|---|---|---|---|---|---|---|
| p | gi6 | p | gi7 | gi8 | p | gi9 | gi10 |
| p | gi11 | p | gi12 | gi13 | gi14 | gi15 | gi16 |
| gi17 | gi18 | | | | | | |

Filling Order →

According to the filling order, store 2 bit (4 values) symbols to the memory or Depends on if Column bit counter[i] is larger than Np[i] size

| p | gi1 | p | gi2 | gi3 | p | gi4 | gi5 |
|---|---|---|---|---|---|---|---|
| p | gi6 | p | gi7 | gi8 | p | gi9 | gi10 |
| p | gi11 | p | gi12 | gi13 | gi14 | gi15 | gi16 |
| gi17 | gi18 | p | gi19 | gi20 | gi21 | gi22 | gi23 |
| gi24 | gi25 | p | gi26 | gi27 | gi28 | gi29 | ... |
| ... | ... | ... | ... | giGi | DTX | DTX | DTX |
| DTX | DTX | DTX | DTX | DTX | DTX | DTX | DTX |

1. Reset Column bit counters to interleaved number of p bits in each column:

2. For each input data, get "the first minimum" ColCnt, store 1 bit data to the column, and increment the column counter by 1.

3. Process stops when all data buffered. Parameters like ColCnt, Np and Hi are stored for output calculation. 1 bit data values are stored in data memory

FIG. 7(b)

METHOD OF FORMING A CODED COMPOSITE TRANSPORT CHANNEL FOR DOWNLINK TRANSMISSIONS

BACKGROUND OF THE INVENTION

1. Field of the Invention

The present invention relates to downlink transmissions and more particularly to first level interleaving for transport channels in the downlink.

2. Description of Related Art

Figure 1:
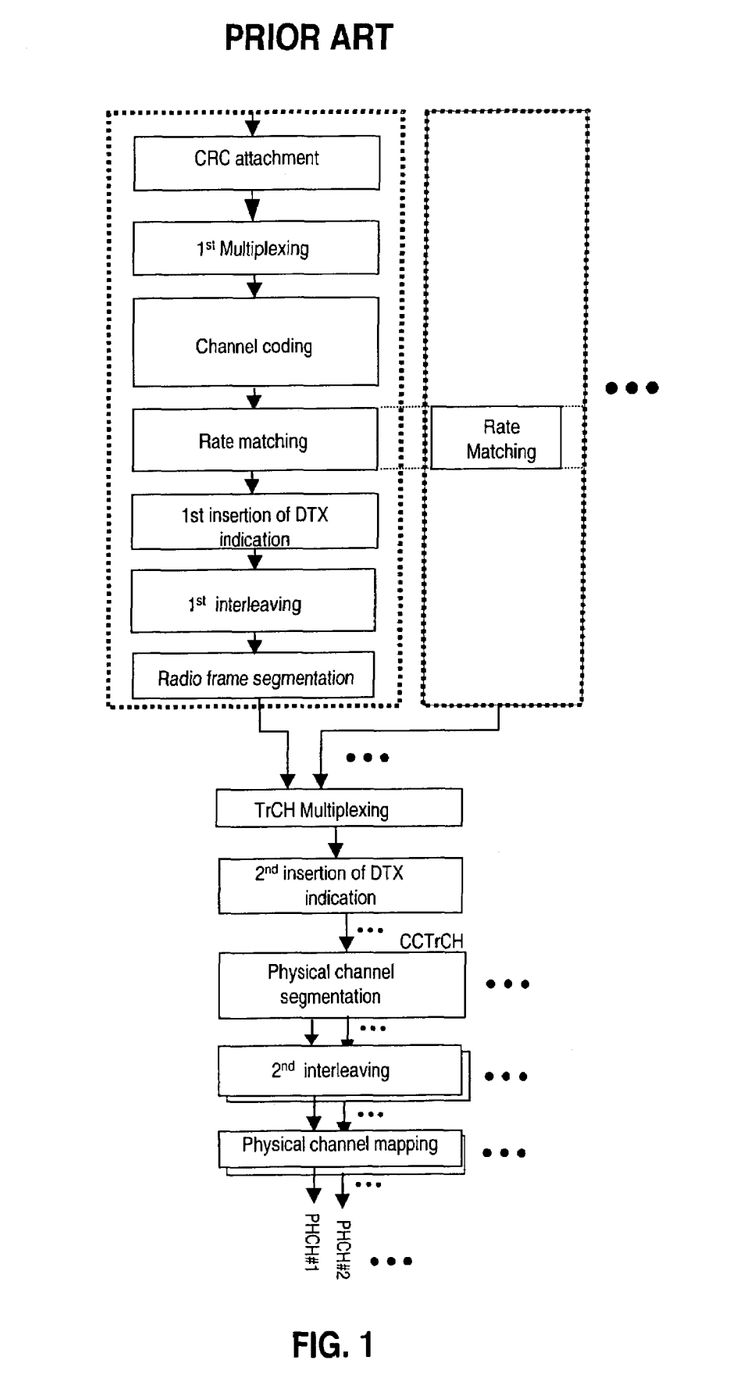
FIG. 1 illustrates a prior art transport channel multiplexing flow diagram for downlink according to a current standard for UMTS.

In technical document 3GPP TS25.212, version 4.0.0. Release 4, which describes the current 3GPP standard for the Universal Mobile Telecommunication System (UMTS) Multiplexing and channel coding (FDD), two interleaving steps are defined in the downlink (base station transmitting to mobile station). FIG. 1 illustrates a well-known prior art transport channel multiplexing structure for downlink according to TS25.212. The functional block performing the interleaving operation may be referred to as an interleaver. Two interleavers, a $1^{st}$ interleaver and a $2^{nd}$ interleaver, connected in series as shown in FIG. 1, are used to interleave the data in a two-step process. The two interleaving steps evenly spread data bits over multiple radio frames. This may result in an improved Bit Error Rate (BER) when compared to non-interleaved data with the same signal to noise ratio (SNR). The reason for these results is that a short fade in the received radio signal does not corrupt a whole series of related bits, making it impossible for the decoder to decode a data bit. Instead, only a number of unrelated bits, which are protected by other bits transmitted in other radio frames, are corrupted.

The $1^{st}$ interleaver is a block interleaver with inter-column permutations, where a matrix is filled row by row with an input bit sequence denoted by $X_{i,1}, X_{i,2}, X_{i,3} \ldots X_{i,xi}$, where i is the transport channel number (TrCH) and $X_i$ is the number of bits. The columns of the matrix are permutated and read out column by column to obtain an output bit sequence from the block interleaver, such as is described in Section 4.2.5.2 of TS25.212. The number of columns (Fi) is equal to the number of radio frames in a transmission time interval (TTI). In the $1^{st}$ interleaver, multiplexing of TrCHs occurs, during which all TrCHs meant for one user are concatenated to form a Coded Composite Transport Channel (CCTrCH). The CCTrCH is sent in one radio frame to that user.

In the $1^{st}$ interleaver, the inter-column permutations are Transmission Time Interval (TTI) dependent. In other words, the $1^{st}$ interleaver spreads the data bits over multiple radio frames depending on the TTI. For example, with a TTI of 80 ms, the data bits exiting the $1^{st}$ interleaver are evenly distributed over eight (8) successive radio frames. The TTI may have the following values: 10 ms (no interleaving), 20 ms (2 radio frames), 40 ms (4 radio frames) and 80 ms (8 radio frames).

There are two modes defined for multiplexing within the 3GPP standard. In a fixed position multiplexing mode, the space taken by a TrCH within a CCTrCH is always constant, regardless of the actual number of bits transmitted. In a flexible position multiplexing mode, the space taken by a TrCH within a CCTrCH is variable. These multiplexing schemes require different processing.

Because the number of bits in a TrCH varies, the remaining space must be filled up to the number of bits in a radio frame. This is done by inserting Discontinuous Transmission (DTX) symbols, which add a third possible 2-bit symbol to the binary data bit. Example mapping would be Binary 0=00, Binary 1=01, DTX=10, pbit=11. With DTX, the transmitter is instructed not to send anything for the duration of that symbol.

According to the standard, in fixed position multiplexing, DTX insertion is done at the input to the $1^{st}$ interleaver, so that tri-valued symbols are stored in a data memory of the $1^{st}$ interleaver. In flexible position multiplexing, DTX insertion is done after $1^{st}$ interleaving and after TrCH Multiplexing, which fills the radio frame with bits after all TrCHs are multiplexed into the frame. This results in two places where DTX insertion is done, requiring additional hardware.

Another operation that may complicate the implementation of the $1^{st}$ interleaver in the 3GPP standard is that the number of bits over which the $1^{st}$ interleaving process must be performed may vary from radio frame to radio frame. The size of TrCHs change from TTI to TTI, and a base station also occasionally needs to reserve gaps in the transmission to allow the mobile to perform measurement of the strength of other base stations, so that the frame size of a CCTrCH may change on a frame by frame basis. These gaps are referred to as "measurement gaps". From this measurement, the mobile may decide whether and when to switch to another base station with better signal quality.

These measurement gaps must be created during interleaving; otherwise the bits are not evenly spread over the radio frames, or will not fit in a radio frame. The size of these measurement gaps may be programmable per radio frame. TS25.212 describes the insertion of a fourth symbol, called a p-bit symbol, in multiplexing with fixed positions. The p-bit must be stored in data memory at the input side of the $1^{st}$ interleaver, and must be removed later at the output side when data is read out from the data memory. By removing the p-bits at the output side, the number of bits transmitted in a radio frame is reduced. This number of bits must be equal to the number of bits normally transmitted during the measurement gap.

In the case described above in the standard, justification for inserting the p-bits is that each symbol is already coded with two bits to accommodate for the DTX symbol needed for fixed position multiplexing, so insertion of the p-bit does not increase memory size. However, the cost may be the additional processing time dedicated to inserting and removal of these p-bits.

Implementation of the 3GPP Standard

Figure 2:
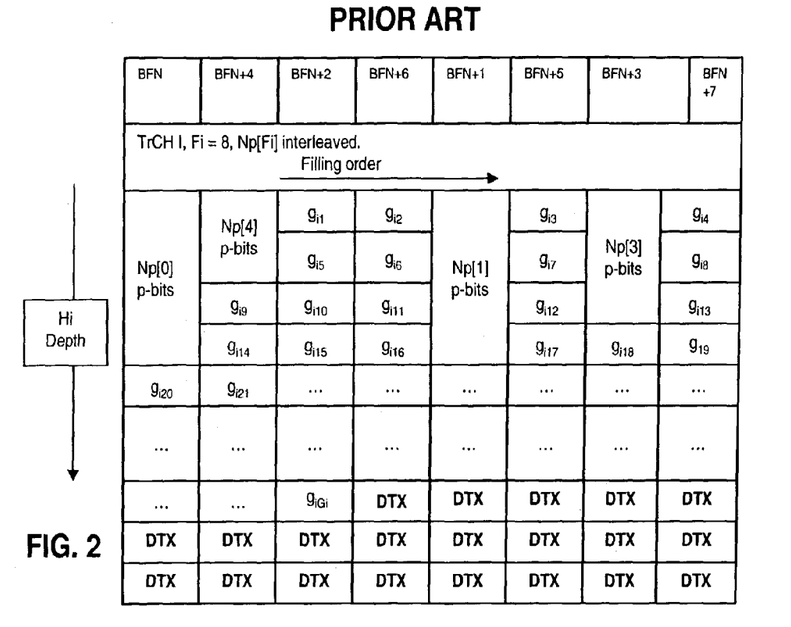
FIG. 2 is a table illustrating a prior art method for dynamically storing data in the $1^{st}$ interleaver for fixed position multiplexing.

FIG. 2 is a table illustrating the well-known prior art method described in the 3GPP standard for dynamically storing data for each TrCH in the $1^{st}$ interleaver for fixed position multiplexing. FIG. 2 is an example of memory content for a TTI=80 ms for one TrCH with fixed position operation, other TrCHs with different TTIs can have a different number of columns than what is shown in FIG. 2. For a Transport Channel (TrCH), the bits received are denoted by gi1, gi2, gi3, . . . , giG. The received number of bits (Gi) is not predictable, as Gi may change every TTI and also when compressed mode gaps are reserved for transmission. These bits are inserted into a number of columns (Fi) depending on the Transmission Time Interval (TTI) of the TrCH. The $1^{st}$ interleaver stores a full TTI of TrCHs that are to be multiplexed within a CCTrCH. Each column (Fi) represents a radio frame of the TTI of a TrCH, and is used to select the permutation patterns. The number of p-bits for each consecutive frame is denoted by Np[0~Fi−1], and is normally pre-inserted in each column. The index of Np is the frame number after permutation, as may be seen from the frame sequence at the top of FIG. 2. In other words, the index of Np is the relative frame number in the TTI, when the index is read out with normal permutation polynomials.

For fixed position mode, each column will contain the same number of bits (Hi). The parameter (Hi) represents the size of a column (from top to bottom, including p bits, data and DTX). The definition of Hi may be different for different TrCH multiplexing. For example, in flexible position multiplexing, Hi=Gi/Fi (number of input bits divided by the number of columns); in fixed position multiplexing, Hi=Gi (max)/Fi (maximum possible number of input bits divided by the number of columns). DTX bits will be inserted in each column after data is received, in order to fill up to Hi. For flexible positions, the column depth Hi is not fixed; thus no $1^{st}$ DTX insertion and p-bit insertion is required. Therefore, Hi will have to be recorded for each column.

The data for each TrCH may be dynamically stored as shown in FIG. 2. In FIG. 2, data for all TrCHs within all CCTrCHs may be stored in a single memory. TrCH multiplexing means to read out an interleaved column of data from each radio frame of every TrCH, and to append TrCHs, one after another, to form a frame of data for a CCTrCH. A $2^{nd}$ DTX insertion means to add DTX bits to the end of TrCH multiplexing, so as to fill up a frame of data for all physical channels (PhCHs) of the CCTrCH (e.g., number of Ndata bits compressed/uncompressed).

Figure 7A:
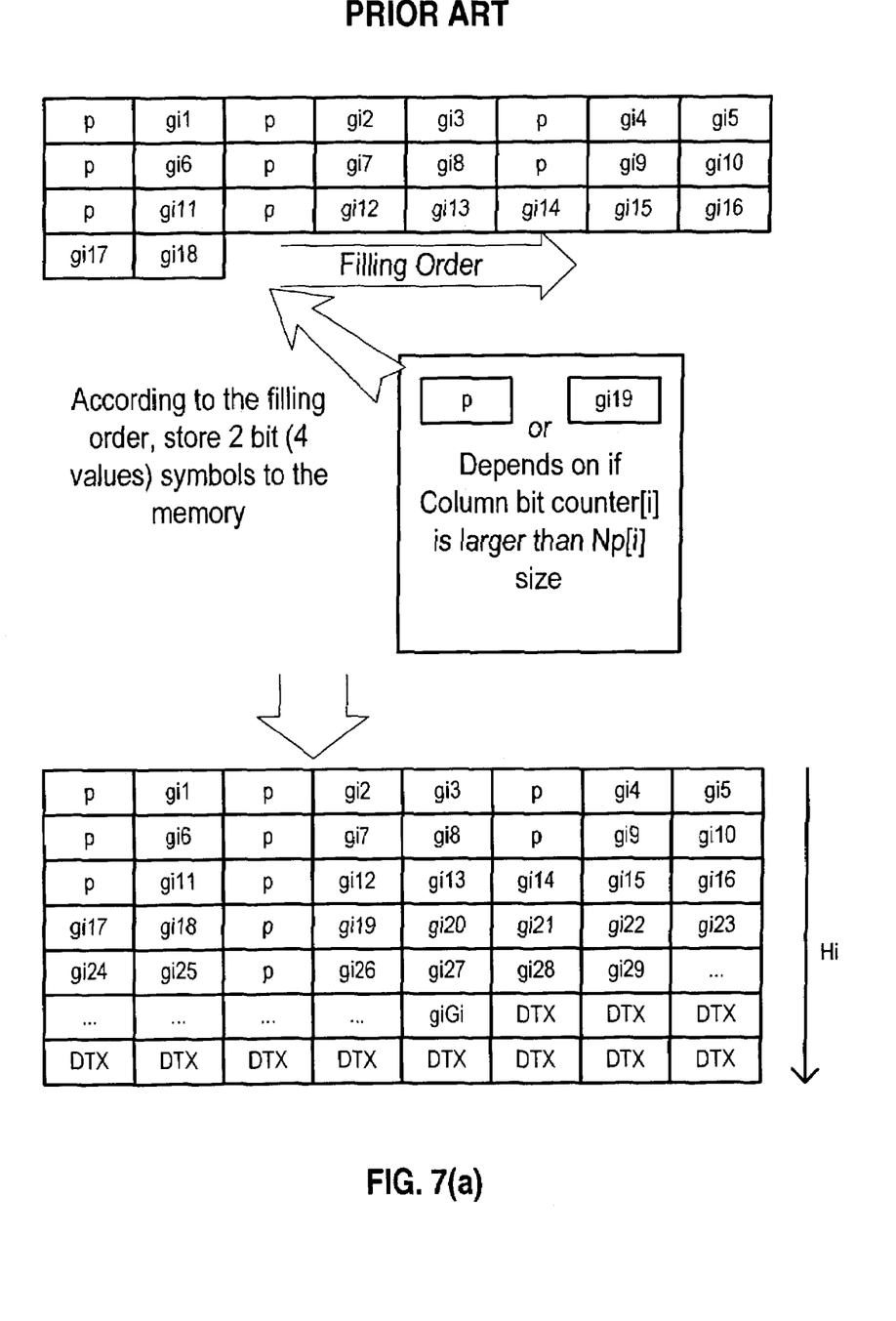
FIG. 7(a) illustrates a prior art input side procedure for the $1^{st}$ interleaver.

FIG. 7(a) illustrates an input side procedure described in the 3GPP standard for the $1^{st}$ interleaver. The memory content of FIG. 2 is constructed based on the procedure illustrated in FIG. 7(a), which is the process of filling a buffer in accordance with TS25.212. Referring to FIG. 7(a), in general a matrix is filled row by row with an input bit sequence denoted by $g_{i,1}, g_{i,2}, g_{i,3} \ldots g_{i,xi}$, where i is the transport channel number (TrCH) and $X_i$ is the number of bits. The columns of the matrix are permutated and read out column by column to obtain an output bit sequence from the block interleaver. The filling order is as shown in FIG. 7(a), and 2 bit, 4-valued symbols (e.g., binary values "00"=data 0, "01"=data 1, "10"=DTX, "11"=p-bit, etc.) are stored to the interleaver memory. Whether a p-bit or a data bit ($g_{i,xi}$) is stored depends on whether a column bit counter (counter(i)) is larger than the number of p-bits for each consecutive frame in that column (Np(i)).

Figure 3A:
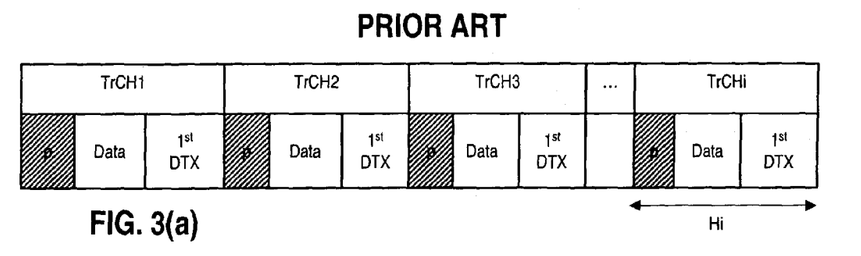
FIGS. 3(a) and 3(b) illustrate the output from a prior art $1^{st}$ interleaver.
Figure 3B:
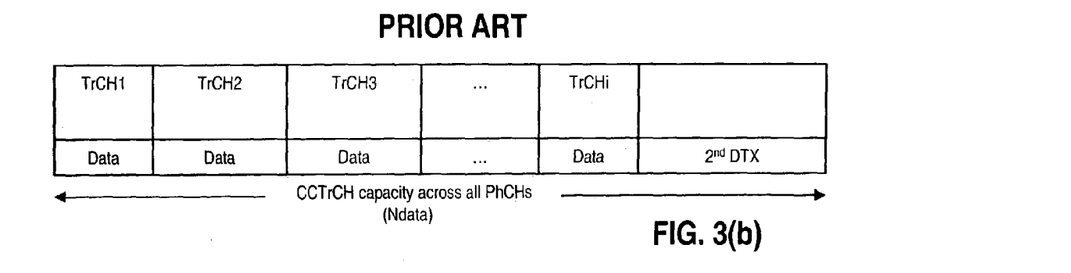

FIGS. 3(a) and 3(b) illustrate the output from a prior art $1^{st}$ interleaver in accordance with the current standard. In particular, FIG. 3(a) and 3(b) illustrates the output after TrCH multiplexing and $2^{nd}$ DTX insertion, e.g., the output of $2^{nd}$ DTX insertion from FIG. 1. FIG. 3(a) shows the output of the $1^{st}$ interleaver for fixed multiplexing, FIG. 3(b) for flexible multiplexing. Initially on the output side, the $1^{st}$ interleaver performs TTI frame permutation. The output side reads one column (radio frame) of a TTI from each TrCH in a CCTrCH to form a CCTrCH frame. In FIGS. 3(a) and 3(b), each TrCH represents only one column in FIG. 2. Thus initially for each TrCH, the output side of the $1^{st}$ interleaver selects which column to read out in memory, as described in Section 4.2.5.2 of TS25.212, for example.

In fixed positions multiplexing, p-bits are used. The p-bits are not actually sent over the air interface by the transmitter, but represent the gaps created for measurement. The p-bits will be removed before physical channel segmentation (see FIG. 1) to reserve space for the transmission gap, therefore the p-bits in FIG. 3(a), shown in cross-hatch, will not be output. In flexible positions multiplexing, reducing the traffic in a radio frame and decreasing the size of the CCTrCH (Ndata in FIG. 3(b)) creates a measurement gap. No p-bits are used in flexible positions multiplexing.

The implementation according to the current 3GPP standard, as described above, may be inefficient in that two-bit, four-valued symbols must be stored at the input side in the $1^{st}$ interleaver data memory. Accordingly, the memory size must be twice the size of what is necessary to store just the data bits of a radio frame.

SUMMARY OF THE INVENTION

Exemplary embodiments of the present invention are directed to a communication method, in which data from a plurality of channels is combined into a composite channel by writing data from the plurality of channels as one-bit symbols to a memory, and reading out the data from memory to form the composite channel. The combining of radio frames from the channels forms a coded composite transport channel for transmitting the data in the downlink. To form the coded composite transport channel, an input process is initiated to write data for each radio frame of a transport channel as one bit symbols to a memory of an interleaver. On an output side of the interleaver, an output process to read out the data stored in the memory is performed to form the coded composite transport channel.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus do not limit the exemplary embodiments of the present invention and wherein.

DETAILED DESCRIPTION

Although the principles of the invention are particularly well-suited for wireless communications systems based on the well-known Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein.

As used herein, the term "base station" may be synonymous to an access network, radio network, system equipment or Node-B, for example, each term of which may describe equipment that provides data connectivity between a network such as a packet switched data network (PSDN), i.e., the Internet, and one or more users. Additionally, the term "user" where used herein, may be equivalent to a user equipment (UE), mobile station, access terminal and remote station, and may describe a remote user of wireless resources in a wireless communication network or a device providing data connectivity to a user, for example.

Exemplary embodiments of the present invention are directed to a communication method in which data from a plurality of channels is combined into a composite channel by writing data from the plurality of channels as one-bit symbols to memory, and reading out the data from the memory to form the composite channel. In an exemplary embodiment, the method includes forming a coded composite transport channel (CCTrCH), where only binary values of data bits (one-bit data) in radio frames in each of 1 to N transport channels (TrCHs) are stored at an input side of a first interleaver. First or second DTX insertion, and creation of a measurement gap, may be performed at an output side of the first interleaver, eliminating a need to store the four-valued symbols. This may reduce the required memory needed in the first interleaver by half.

In accordance with the exemplary embodiments of the present invention, $2^{nd}$ DTX bits (e.g., DTX bits resulting from a second DTX insertion process) may be inserted after the interleaving performed in the first interleaver; in other words, on the output side of the first interleaver. This is because, as to be further described in the exemplary embodiments, $1^{st}$ and $2^{nd}$ DTX insertion functions may be combined at one insertion point. Having a single insertion point for DTX bits at an output side of the first interleaver may therefore substantially reduce hardware requirements for downlink transmission.

Figure 7B:
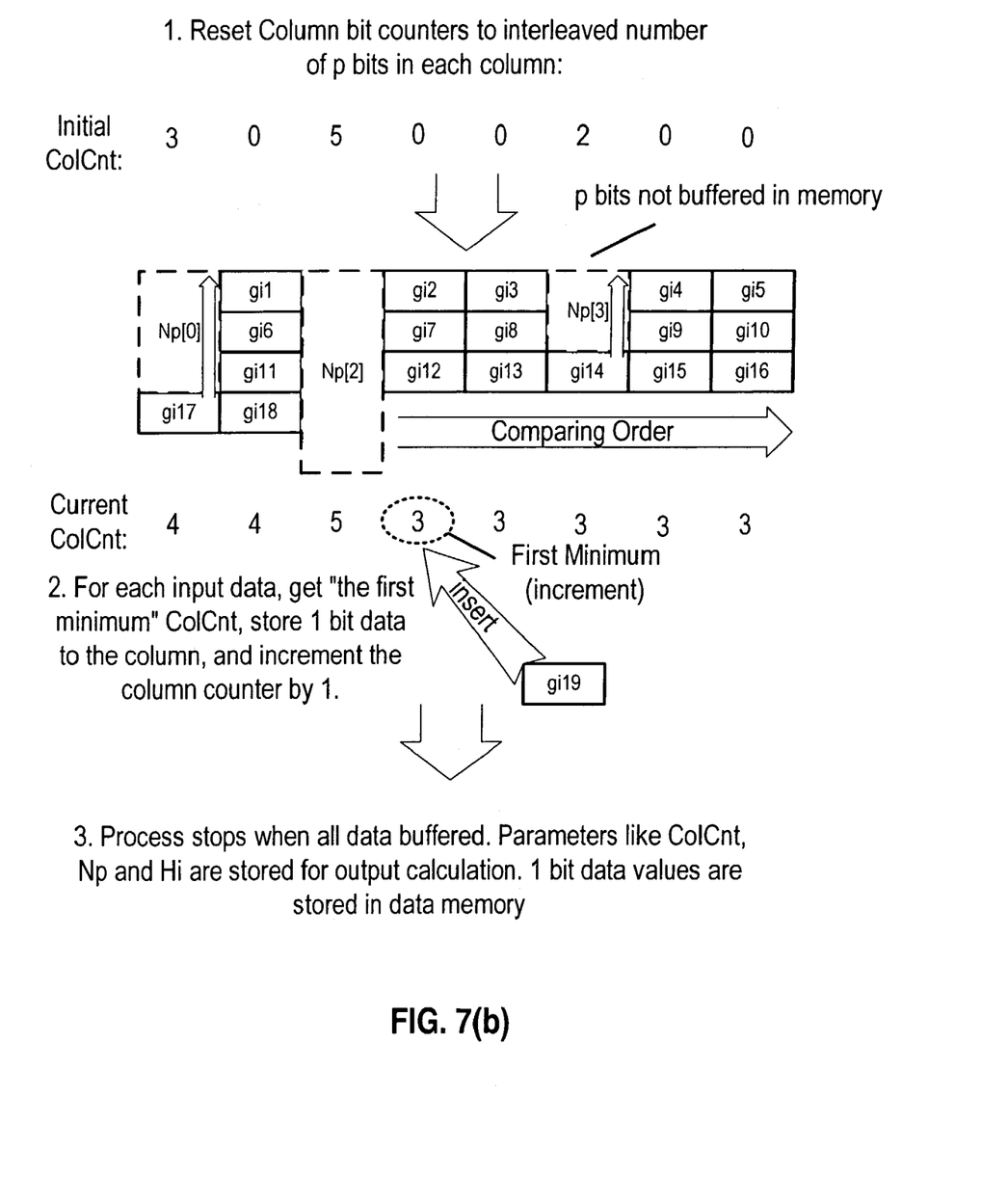
FIG. 7(b) illustrates an input process in accordance with an exemplary embodiment of the invention.

FIG. 7($b$) illustrates an input process in accordance with an exemplary embodiment of the invention. Referring to FIG. 7($b$), each column has a column bit counter ColCnt(i), i=0 to 7, having its initial count reset to equal the number of p bits in the column Np(i). For each input data ($g_{i,x}$) the data is stored in the column with the lowest ColCnt value evaluated with incrementing index (left to right in FIG. 7($b$)) and called a first minimum. In the example of FIG. 7($b$) the next data bit gi19 is stored as a 1-bit symbol in the fourth column, after which ColCnt(4) is incremented (to 4). The next minimum counter value is determined based on the direction of the comparing order, etc. until all data of all TrCHs have been buffered. The 1-bit data values stored in memory, and counter parameters referred to as ColCnt, Np and Hi, to be discussed in further detail below, are also stored, to be used for the output calculation.

Figure 4:
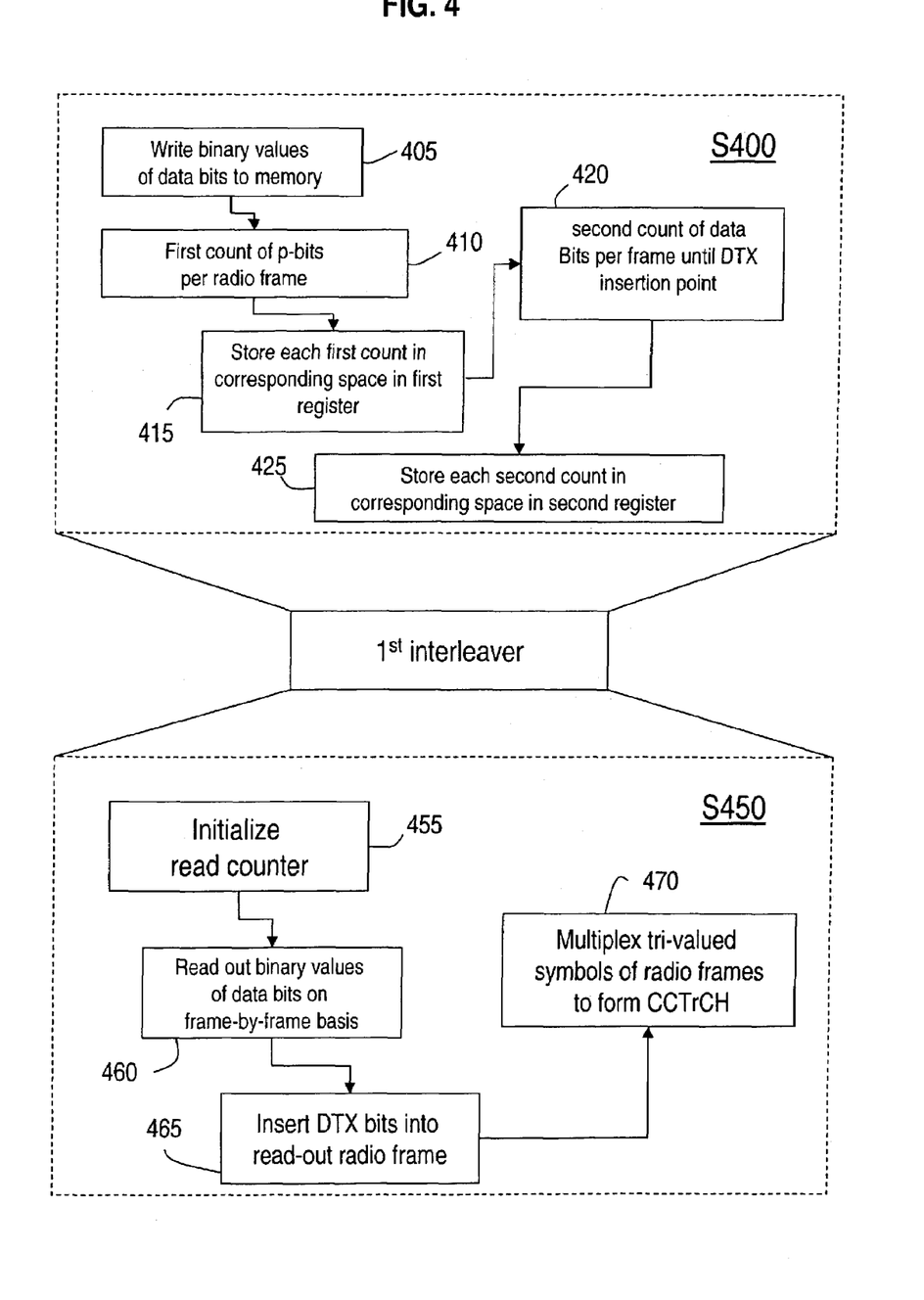
FIG. 4 is a flowchart illustrating a method in accordance with an exemplary embodiment of the invention.

FIG. 4 is a flowchart illustrating a method of forming a coded composite transport channel (CCTrCH) from radio frames of N transport channels (TrCHs) for downlink transmission, in accordance with an exemplary embodiment of the invention. As an input to a first interleaver, (see FIG. 1), an input process (S400), such as was described in FIG. 7($b$), for example, may be initiated to write data from each radio frame of each Nth TrCH (for 1 to N TrCHs) to a memory. No discontinuous transmission (DTX) insertion process is performed at the input side of the first interleaver. On an output side of the first interleaver, an output process (S450) may be performed in order to form the CCTrCH. A DTX insertion process may be performed only at the output side of the first interleaver to insert DTX bits into each radio frame read out from the memory.

Input process S400 may include several functions. For example, and as to be described in further detail below, the following may be performed for each input radio frame, until the complete TrCH has been stored. Binary values of data bits in each radio frame are written (S405) to the memory. These binary values of the data bits may be stored as one-bit symbols, instead of as 2-bit, four valued symbols, as previously described above with respect to the example of FIG. 7($b$). A first count of a number of p-bits in each radio frame is performed (S410) to generate a first count value for each radio frame of a TrCH. The p-bits may represent bits created due to puncturing of the radio frame, for example. For each radio frame until a complete TrCH has been processed, each first count value is stored (S415) in a corresponding space in a first register.

A second count may then be performed (S420) to generate a second count value. The second count value may represent a count of a total number of data bits in each radio frame before a known insertion point for insertion of discontinued transmission (DTX) bits is identified or reached in the radio frame. The number of p bits per column is known. Also, the number of total data bits, Gi, is known, hence the number of data bits per column is known. By subtracting the number of p bits per column plus the number of data bits per column from the column depth (H), the amount of DTX bits needed per column to fill the column may be determined. Hence the DTX insertion point per column is known. For each radio frame, until a complete TrCH has been processed, each second count value may be stored (S425) in a corresponding space in a second register. Input process S400 may be repeated until N complete TrCHs have been stored for downlink transmission in the first interleaver.

Output process S450 may include several functions. As to be described in further detail below, for each TrCH that is to be read out from memory, a read counter may be initialized (S455) after the columns have been permutated based on the TTI and using permutation polynomials such as are described in Section 4.2.5.2 of TS25.212, for example. A reading out function (S460) may be performed based on the location of a particular frame in the TrCH's TTI. For each read out radio frame, a DTX insertion function (S465) may be performed, inserting DTX bits into each read out radio frame. Thus, the read out binary values may be converted into two, 2-bit symbols and may include a third, inserted 2-bit DTX symbol. Accordingly, the data bits may be converted into a tri-valued symbol to accommodate the DTX symbol at the output side of the first interleaver. The plurality of radio frames being read out from the TrCHs stored in memory, which may be embodied as a plurality of tri-valued symbols, may be multiplexed (S470) to form a CCTrCH for transmission in the downlink.

Figure 5:
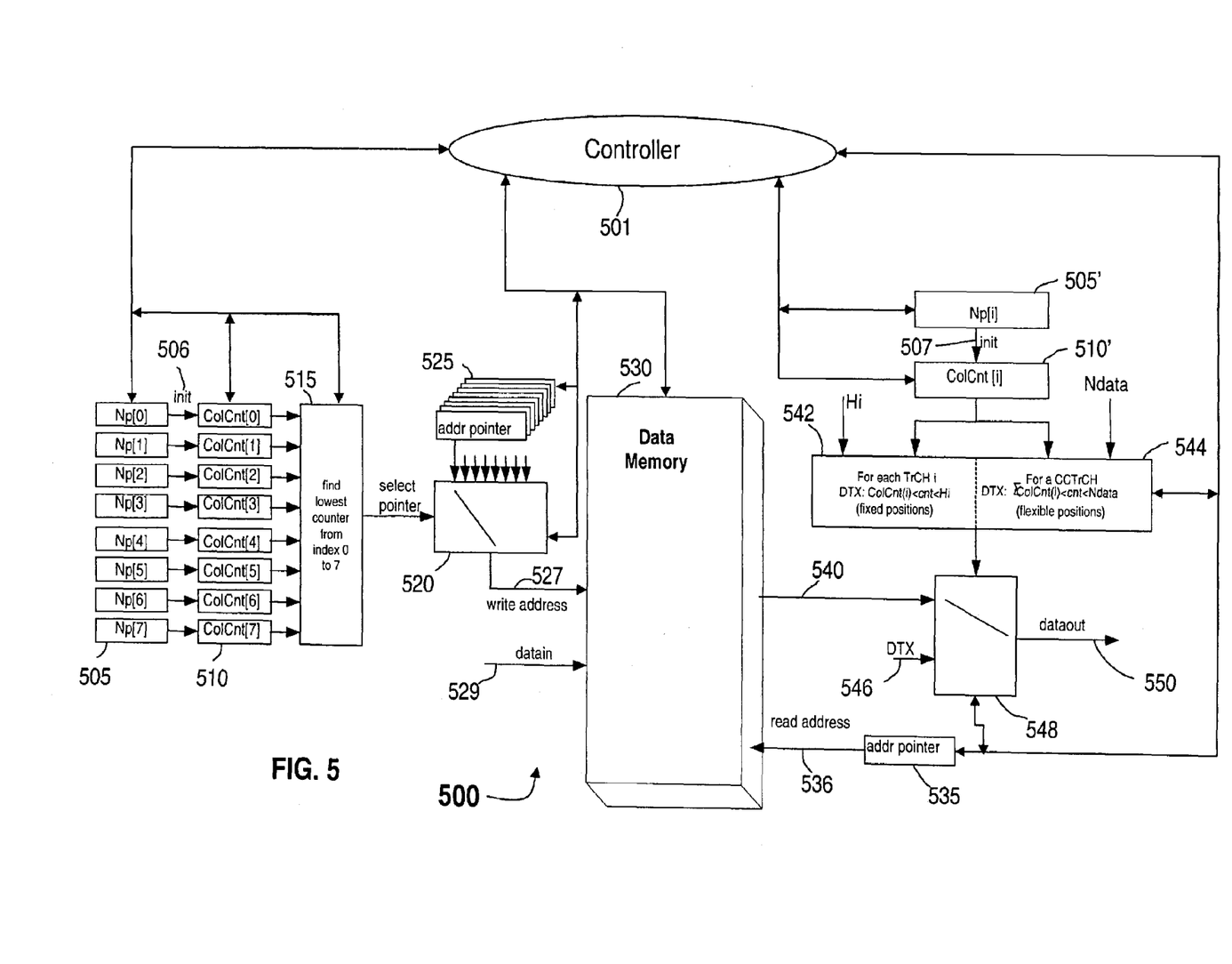
FIG. 5 illustrates a first level interleaving arrangement in accordance with an exemplary embodiment of the invention.
Figure 6:
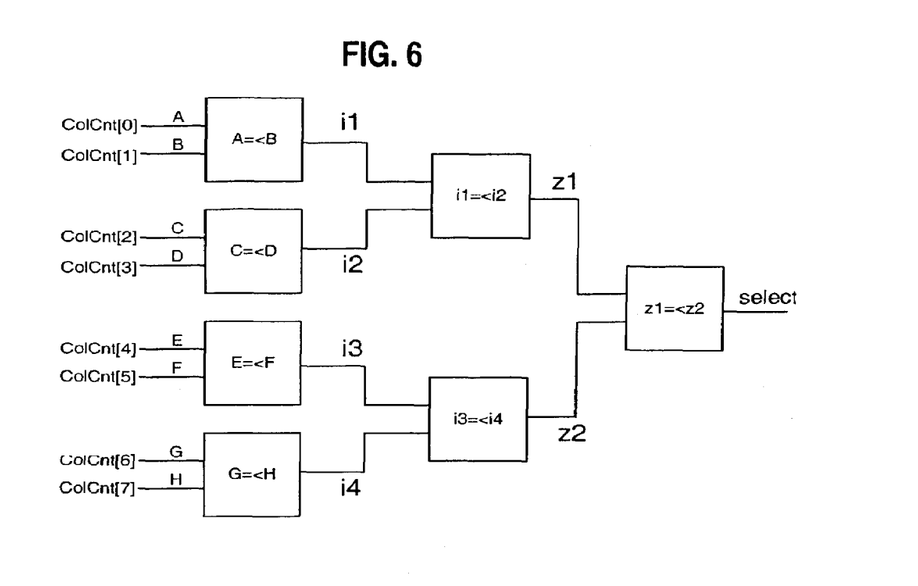
FIG. 6 is a flow diagram illustrating a determination of a lowest count value in accordance with an exemplary embodiment of the invention.
Figure 8A:
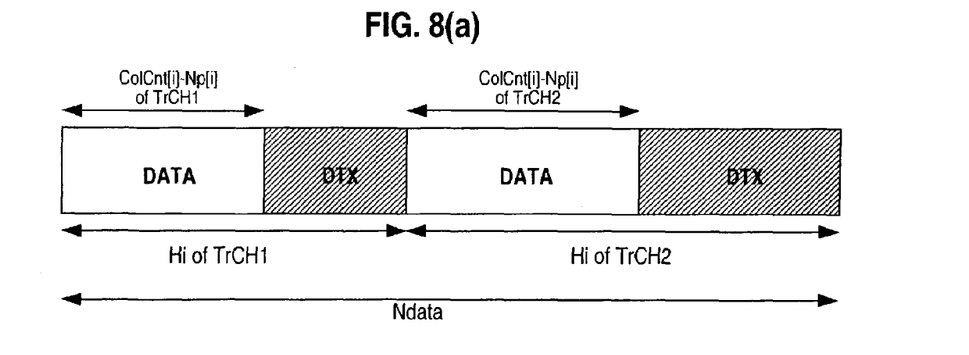
FIGS. 8(a) and 8(b) illustrate data formats of output processes for fixed position multiplexing and flexible position multiplexing in accordance with an exemplary embodiment of the invention.
Figure 8B:
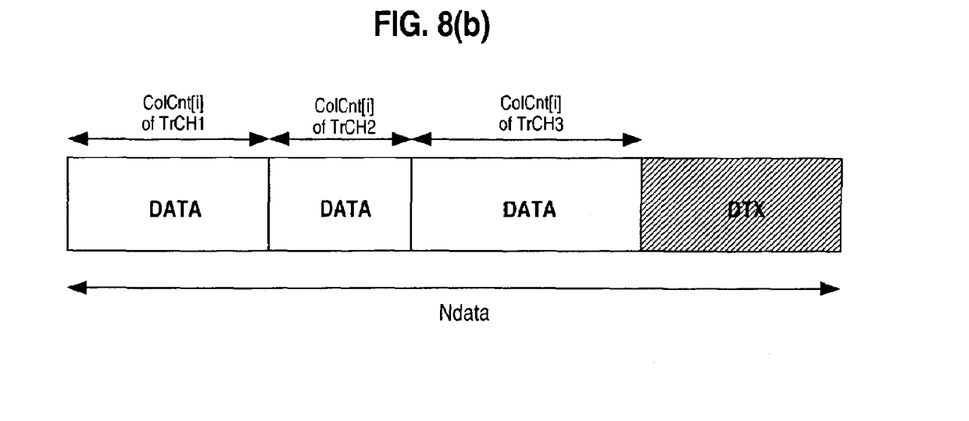

FIG. 5 illustrates a first level interleaving arrangement (hereinafter "first interleaver") in accordance with an exemplary embodiment of the invention. FIGS. 6-8($b$) are provided so as to describe, in further detail, aspects of the input process S400 at an input side of the first interleaver, and aspects of the output process S450 at an output side of the first interleaver. For the following discussion, FIGS. 6-8($b$) should be read with occasional reference to FIG. 5.

It should be noted that the particular first interleaver arrangement 500 to be described is meant to be illustrative only, and not limiting as to the scope of the invention. The components illustrated in FIG. 5, including controller 501, could be implemented completely in software on a processor (not shown), completely in hardware, or in an arbitrary combination of hardware and software where the processor may control hardware blocks. The processor may be constructed with one or more conventional microprocessors such as the currently available PENTIUM processors from Intel or a programmable digital signal processor. However provided that sufficient processing speed is available, the functions or processes may be carried out, by any general-purpose or special-purpose digital computing device operating under the control of an appropriate software, hardware, or firmware program. Those skilled in the art will appreciate that the specific computational results to be achieved may be reached by any of numerous combinations of mathematical steps. All such combinations of mathematical steps are deemed equivalents for purposes of the present invention. Within first interleaver arrangement 500, p-bit insertion, $1^{st}/2^{nd}$ DTX insertion, interleaving, p-bit removal, and TrCH multiplexing at an output side may be performed within one function. First interleaver arrangement 500 may be suitable for a hardware configuration and a software implementation. Regardless of whether first interleaver arrangement 500 is implemented in hardware or software, the memory savings may be the same.

Memory space in a data memory 530 for a TrCH may be partitioned and allocated before the data arrives, depending on the TTI length of the received TrCH. The data may be spread over an Fi number of columns by writing (write address 527) to pre-defined memory partitions (not shown) in data memory 530. The memory partitions may be referenced with address pointers 525, for example.

Input Process

The following should also be read with FIG. 7(b), as described above. As part of an initialization process (init 506), the Np values (e.g., the number of p-bits for each consecutive frame is denoted by Np[0~Fi−1]) stored in Np registers 505 are preset in respective Column Counter registers 510 (ColCnt(i)) to register the number of bits written to each of the columns, as shown in FIG. 5. With TTI's smaller than 80 ms, any unused ColCnt register 510 may be preset with a single value so that these column counters do not qualify as a column counter with the minimum count value discussed in FIG. 7(b). For TrCHs of different TTI, different numbers of columns may be needed. For example, a 40 ms TTI TrCH will have only 4 columns, therefore only ColCnt's (0 to 3) in FIG. 5 may need to be used, the other four (ColCnt's 4-7) may be disabled by setting these counters to a very large (max) number so there is no possibility for them to appear as a $1^{st}$ minimum number during filling of the memory, as shown in FIG. 7(b).

The data memory 530 may be divided in a Fi number of memory blocks representing the columns in FIG. 2, for example. Fi may be equal to the number of radio frames, which is equal to the TTI. The address pointers 525 receive the starting addresses of the memory partitions in data memory 530. The starting addresses may be calculated based on the TrCH size, divided by Fi (=column depth Hi). These starting addresses of the memory partitions and Hi are stored in data memory 530, as they may be needed when reading out at the output side of the first interleaver arrangement 500. The TrCH starting address pointers 525 point to the first bit in the first column, point to the starting address of the second column, which equals TrCH starting address+ Hi; the starting address of $3^{rd}$ column=TrCH starting address+2Hi, etc.

FIG. 6 is a flow diagram illustrating a determination of a lowest count value in accordance with an exemplary embodiment of the invention. FIG. 6 should also be read with FIG. 7(b) for clarity. For each bit received (data-in 529) at the input, a first minimum count value of ColCnt[0 to 7] may be found at 515. The minimum count value may be determined from the left to right as illustrated in FIG. 7(b) for example. The principle of finding the minimum counter value may be explained with reference to FIG. 6, which is only an exemplary process of determining a lowest count value. Referring to FIG. 6, counts from pairs of counters are compared, with the lower count (A, C, E and G) being represented by i1 through i4. In FIG. 6, i1 and i3 are the lowest counts from the next comparison, represented by z1 and z2. Thus, z1 represents the count of ColCnt(1), and z2 represents the count of ColCnt(4). By process of elimination, ColCnt(1) has the lowest count, it is the minimum counter value. The search for the input to select may use a priority scheme. In the case that two or more inputs have the same value, the input with the lowest index may be selected. Of course, other techniques could be used to determine the lowest count value.

To completely trace the data stored in data memory 530, two values per column (two values for each radio frame) are needed. One counter, e.g., one of Np registers 505 (Np[0 to 7]) is needed for recording the number of p-bits in a particular radio frame of a TrCH, and a ColCnt register 510 (one of ColCnt[0 to 7]) is needed for keeping record of the total number of data bits in a particular radio frame of a TRCH, before a DTX insertion point is reached in the radio frame.

A selector 520 may select the appropriate address pointer 525 and provide a write address 527 for storing the data bit in a particular memory partition within data memory 530, after which both the associated address pointer 525 and the associated ColCnt register 510 may be incremented by one. This process may be continued until the last data bit of a TrCH is stored in data memory 530. When a TrCH is "completed" (stored), generated counter values of registers Np 505 (first count values), ColCnt registers 510 (second count values) and Hi (column depth) may be stored in specified memory partitions within data memory 530 for later reference, such as when the data is read back from data memory 530 via associated address pointers 535 pointing to read addresses 536 that correspond to the associated data bit, and generated counter values. This input process S400 may be applicable for both fixed position and flexible position multiplexing. Further, more than one data bit may be stored per memory location in data memory 530; thus there may be multiple data bits associated with one memory address.

Output Process

When reading out a radio frame of information, there are two multiplexing scenarios to consider: fixed positions multiplexing mode and flexible positions multiplexing mode. In fixed position multiplexing, the space taken by a TrCH is always constant, regardless of the actual number of bits transmitted. In flexible position multiplexing, the space taken by a TrCH is variable. These multiplexing schemes require different processing. In accordance with the exemplary embodiments of the present invention, a primary difference between whether fixed position multiplexing or flexible position multiplexing is performed is related to the DTX insertion function.

FIG. 8(a) illustrates an data format of an output process for fixed position multiplexing. FIG. 8(a) shows an example of a CCTrCH with two (2) TrCHs in a fixed position mode.

Referring also to FIG. 5, a procedure for fixed position multiplexing, or in other words, to perform output process S450 for fixed position multiplexing, may include the following. Initially, a read counter 542 may be preset to Np[i] 505' for each TrCHi. For all TrCH[1 to N], data 540 is read out from data memory 530, using address pointers 535 that point to read address 536, which are already stored in data memory 530, corresponding to address pointes 525/write addresses 527 until read counter 542 reaches ColCnt[i] 510'.

The example mapping to 2-bit symbols used thus far has been described as Binary 0=00, Binary 1=01, DTX=10, p-bit=11. Hence, all binary 0 values being read from the memory are converted to a 2-bit symbol, which is 00 in the above example. All binary 1 values being read from the memory are converted to a 2-bit symbol, which is 01 in the above example. At this point, DTX symbols 546 may be inserted (at multiplexer 548) for output as a tri-valued symbol 550, equal to 10 in the example, where the radio frame includes two, 2-bit data symbols and a third, 2-bit DTX symbol. Read counter 542 may be incremented until it reaches Hi. Hi marks the end of a column, so the reading for a next TrCH should start if there is any next TrCH.

FIG. 8(b) illustrates an data format of an output process for flexible position multiplexing. FIG. 8(b) shows an example of a CCTrCH with three (3) TrCHs in a flexible positions mode. The procedure for flexible position multiplexing may be to reset read counter 544 to zero. Then for all TrCH[1 . . . N], reset the read counter 544 to zero and read data bits from data memory 530, via address pointer 535 and read address 536, until the read counter reaches ColCnt[i] 510, with read counter 544 with every bit 540. After all TrCHs are read, output DTX symbols 546 to multiplexer 548 until a count of read counter 544 reaches a value of Ndata, which is the total number of bits in a CCTrCH.

The output processes described with respect to the exemplary data formats in FIGS. 8(a) and 8(b) may be combined if Hi=Hi for all TrCH in fixed positions, and if Hi=ColCnt[i] for each TrCH in a flexible position. No $2^{nd}$ DTX bits are to be inserted for fixed positions mode, and no $1^{st}$ DTX bits are to be inserted in flexible mode. This may be explained with respect to FIGS. 3(a) and 3(b) previously discussed.

In a fixed position multiplexing mode (FIG. 3(a)), where the size allocated to each TrCH in a CCTrCH is fixed, if input data for a radio frame for a TrCH is smaller than the allocated size, a $1^{st}$ DTX insertion is done to fill the remainder of the CCTrCH. In flexible positions multiplexing mode (FIG. 3(b)), where the size allocated to the combined TrCHs' data within a CCTrCH is fixed, once all data for each TrCH for that radio frame has been concatenated, if the size is smaller than allocated, a $2^{nd}$ DTX insertion is done to fill the remainder of the CCTrCH.

Accordingly, at the output multiplexer 548, the data bits may be converted into a tri-valued symbol 550 to accommodate for the DTX symbol 546. Since the p-bits were never inserted, the p-bits do not need to be removed, which may save substantial processing power.

The exemplary embodiments in accordance with the present invention may save up to half of the first interleaver data memory. The memory savings may be substantial, especially for base stations having many users, where the first interleaver data memory is typically the largest memory in the downlink. Reducing the size of this memory by half could potentially result in substantial cost reductions.

The exemplary embodiments of the present invention being thus described, it will be obvious that the same may be varied in many ways. Such variations are not to be regarded as a departure from the spirit and scope of the exemplary embodiments of the present invention, and all such modifications as would be obvious to one skilled in the art are intended to be included within the scope of the following claims.

What is claimed is:

1. A communication method, comprising:
combining data from a plurality of channels into a composite channel by writing data from the plurality of channels as one-bit symbols to a memory;
reading out the data from the memory;
inserting discontinuous transmission (DTX) bits only into the data read out from the memory; and
forming a composite channel to transmit the data.

2. The method of claim 1, wherein said combining includes forming a coded composite transport channel (CCTrCH) from radio frames of N transport channels (TrCHs) for downlink transmission.

3. The method of claim 2, wherein said forming includes:
initiating an input process to an interleaver to write data from each radio frame of each Nth TrCH as one-bit symbols to a memory; and
implementing an output process from the interleaver to form said CCTrCH, said implementing including inserting DTX bits into each radio frame read out from said memory.

4. The method of claim 3, wherein said initiating an input process further comprises, for each radio frame of a TrCH until a complete TrCH has been stored:
generating a first count of a number of p-bits in each radio frame, the p-bits representing bits created due to puncturing of the radio frame, and
generating a second count of a total number of data bits in each radio frame before a known insertion point for insertion of discontinued transmission (DTX) bits is reached.

5. The method of claim 4, wherein said initiating an input process further comprises, for each radio frame of a TrCH until a complete TrCH has been stored:
storing the first count of p-bits in each radio frame in a corresponding space in a first register;
writing binary values of data bits in each radio frame to the memory; and
storing the second count of a total number of data bits in each radio frame before the known DTX insertion point in a corresponding space in a second register.

6. The method of claim 4, wherein said initiating an input process is performed without performing one or more of a discontinuous transmission (DTX) insertion process and a p-bit insertion process.

7. The method of claim 5, further comprising, for each radio frame of a TrCH until a complete TrCH has been stored:
setting an initial count of said second count to equal the corresponding first count for each radio frame;
determining a column associated with a minimum second count value from the initial second counts;
writing binary values of data bits to the column corresponding to the determined minimum second count value in the memory;
incrementing the second counter having the minimum second count value; and
repeating the determining, writing and incrementing until a complete TrCH has been stored, at which second count values have been generated for each column.

8. The method of claim 4, wherein the output process is implemented, for each TrCH stored in memory, based on the generated first and second counts of each radio frame to form said CCTrCH.

9. The method of claim 8, wherein said implementing an output process further comprises, for each TrCH stored in memory:
reading out said stored binary values of data bits on a frame-by-frame basis;
inserting the DTX bits into each read out radio frame that is not completely filled by said read-out binary values of data bits; and
multiplexing the plurality of radio frames to form a CCTrCH for transmission in the downlink.

10. The method of claim 9, wherein said reading out is performed based on said generated first and second counts stored in said first and second registers.

11. The method of claim 9, wherein
said reading out further includes converting said read out binary values to two 2-bit symbols, and
said inserting further includes inserting a third 2-bit DTX symbol into each read out radio frame that is not completely filled by said read-out binary values of data bits.

12. An interleaver having reduced storage requirements for transmitting in the downlink, which forms a composite channel, the interleaver comprising:
a selector providing a write address in a memory for writing data from a plurality of channels as one-bit symbols to the memory; and
a multiplexer inserting all discontinuous transmission (DTX) bits only into data read out from the memory to form a composite channel.

13. An interleaver of a transport channel multiplexing structure for downlink which forms a coded composite transport channel, the interleaver comprising:
a selector providing a write address in a memory for writing data from a plurality of channels as one-bit symbols to the memory; and
a multiplexer inserting all discontinuous transmission (DTX) bits only into data read out from the memory to form a composite channel.

14. A method of storing radio frames of N transport channels (TrCHs) to form a coded composite transport channel (CCTrCH) for downlink transmissions, comprising:
for each radio frame of a TrCH, until a complete TrCH has been stored:
generating a first count of a number of p-bits in each radio frame, the p-bits representing bits created due to puncturing of the radio frame, and
generating a second count of a total number of data bits in each radio frame before a known insertion point for insertion of discontinued transmission (DTX) bits is reached;
setting an initial count of said second count to equal the corresponding first count for each radio frame;
determining a minimum second count value from the initial second counts;
writing binary values of data bits of a radio frame corresponding to the determined minimum count value to the memory;
incrementing the second counter having the minimum second count value; and
repeating the determining, writing and incrementing until a complete TrCH has been stored.

15. The method of claim 14, wherein said writing further includes storing said binary values of data bits as one-bit symbols.

16. The method of claim 14, wherein a complete TrCH is stored without performing one or more of a discontinuous transmission (DTX) insertion process and a p-bit insertion process.

17. A method of forming a coded composite transport channel (CCTrCH) for downlink transmissions from a plurality of stored transport channels (TrCHs), each TrCH comprising a plurality of radio frames, comprising:
for each radio frame of each stored TrCH:
reading out stored binary values of data bits on a frame-by-frame basis, the binary values of data bits stored as one-bit symbols;
converting said read out binary values stored as one-bit symbols to two 2-bit symbols;
inserting a third 2-bit DTX symbol into each read out radio frame that is not completely filled by said read-out binary values of data bits; and
multiplexing the plurality of radio frames to form a CCTrCH for transmission in the downlink.

18. A method of inserting data bits in a memory of an interleaver, comprising:
for each data bit of each radio frame of a transport channel (TrCH), until a complete TrCH has been stored:
setting a number of p-bits in each radio frame as a first count value for each radio frame;
counting data bits in each radio frame to set a second count value for each radio frame;
storing each first count value of p-bits for each radio frame in a corresponding space in a first register;
storing each second count value of data bits for each radio frame in a corresponding space in a second register;
determining a first minimum count value from the stored first and second count values in the first and second register;
inserting a data bit in a space in the memory corresponding to the register having the lowest count value; and
incrementing the register.

19. The method of claim 18, wherein
said p-bits represent bits created due to puncturing of the radio frame, and
said counting further includes counting a total number of data bits in each radio frame before a known insertion point for insertion of discontinued transmission (DTX) bits is reached in each radio frame.

20. The method of claim 18, wherein said determining, inserting and incrementing are repeated until all data bits of the TrCH have been stored in the memory.

21. The method of claim 20, wherein said data bits are stored as one-bit symbols to the memory.

22. A method of communicating data, comprising:
initiating an input process to an interleaver to write data from radio frames of a plurality of channels as one-bit symbols to a memory without performing a discontinuous transmission (DTX) insertion process; and
implementing an output process from the interleaver to form a composite channel, the implementing including inserting DTX bits into one or more radio frames read out from said memory.

* * * * *